April 7, 1953  J. V. JORGENSEN  2,633,980
MICROSCOPE SLIDE HOLDER
Filed Nov. 20, 1951
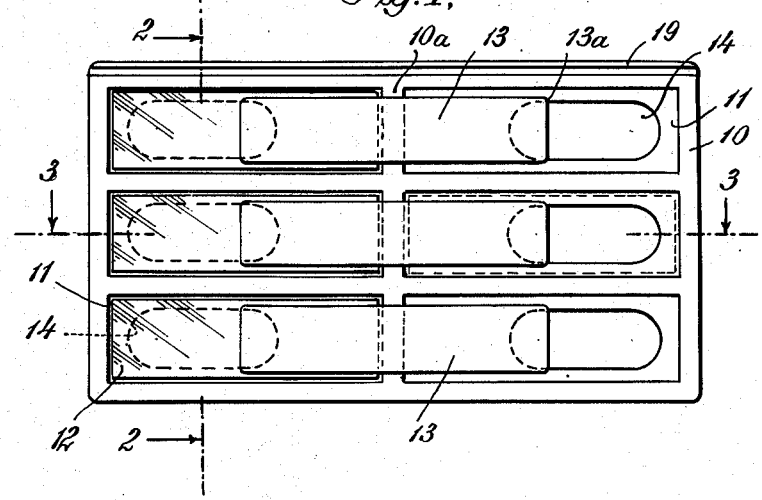
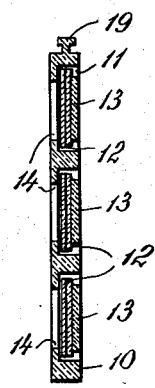
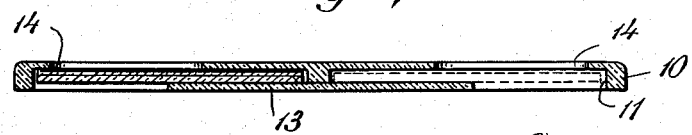
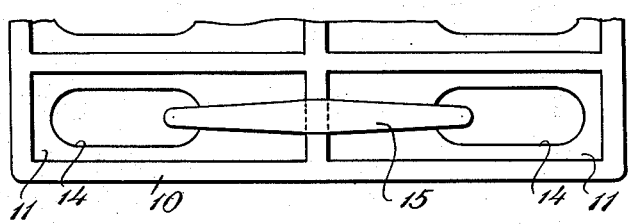
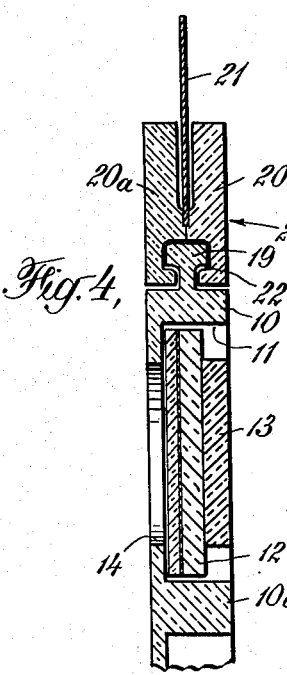
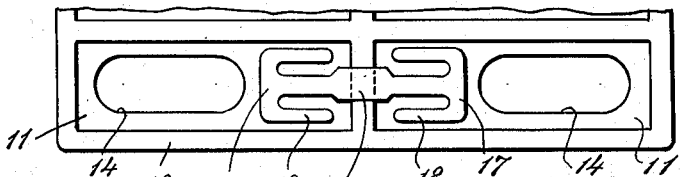
INVENTOR
Johannes Vesterdal Jorgensen
BY
Pennie Edmonds Morton Burrows Taylor
ATTORNEYS Patented Apr. 7, 1953

2,633,980

UNITED STATES PATENT OFFICE 2,633,980

MICROSCOPE SLIDE HOLDER

Johannes Vesterdal Jorgensen, Odense, Denmark

Application November 20, 1951, Serial No. 257,207
In Denmark June 14, 1950

3 Claims. (Cl. 206—16)

This invention relates to a holder for microscope slides, which is adapted to hold a plurality of slides and may be stored on edge with others, so that a large number of the slides may be kept in a small space and are readily available.

Microscope slides comprise a glass plate of a standard size, on which the specimen is mounted, and a thin cover glass, which overlies the specimen and through which observation takes place. It is desirable to store the slides in such a way as to protect them against damage, while keeping them readily available for use, and the availability of the slides is of particular importance, when the slides carry a set of related specimens, with which new specimens are to be compared from time to time.

It has heretofore been proposed to mount a number of specimens forming a set on a common base plate and to protect all of the specimens by a common cover glass. Such multiple slides are then commonly stored by stacking. While such a multiple slide serves the purpose of keeping together a group of related specimens, it is somewhat awkward to handle and the selection of a multiple slide from a stack presents difficulties.

The microscope slide holder of the invention comprises a rigid plate provided with recesses or cells capable of receiving a plurality of individual slides which, when not in use, are firmly held in position in their respective cells by resilient means and can be readily removed from their cells for examination. The new holder permits the storing of sets of related slides in a systematic manner and the holder can be filed on edge with others in a drawer or box in the same manner as index cards, so that all the advantages of card filing, such as grouping, easy selection of individual subjects, etc., are made available.

The rigid plate of the new holder may be made of glass or other transparent material and the recesses or cells may be formed in its surface or in the edges thereof. The holding means are of flexible resilient material and are attached to the plate in such a manner as to press on the surface of the slides and hold them in place. Preferably, the recesses are formed in the surface of the plate and they are arranged in pairs with the recesses for a pair having their long axes aligned. The pairs of recesses lie in a row and the holding means are attached to the plate between individual recesses of a pair with the free ends of the holding elements overlying and partially closing the recesses. The slides can be removed from their recesses by raising the free ends of the holding elements, and, if desired, the plate may be formed with openings leading through it from the side opposite to that, in which the recesses are formed, the openings leading into the bottom of the recesses. With this arrangement, each slide may be readily removed by insertion of a finger through an opening to push the slide out of its recess to expose an edge thereof.

For convenience in handling, the plate is preferably formed with a projection along one edge and a support for a card carrying identifying data is detachably mounted on the projection. When the holder is stored on edge with others, the cards of the several holders are then exposed, so that the data thereon can be read and the desired holder selected.

For a better understanding of the invention, reference may be made to the accompanying drawing in which:

Fig. 1 is a plan view of one form of the new holder;

Figs. 2 and 3 are sectional views on the lines 2—2 and 3—3, respectively, of Fig. 1.

Fig. 4 is a fragmentary transverse sectional view through a holder of the invention provided with a card support; and Figs. 5 and 6 are fragmentary plan views showing modified constructions.

The new holder in the form shown in Figs. 1 to 3, inclusive, comprises a flat plate 10 of rigid material, which is preferably transparent and may be of glass or a suitable plastic, and, in one surface of the plate, there are formed a plurality of recesses or cells 11 for receiving microscope slides 12. The slides, which are of standard size, are oblong in shape and the recesses are of similar shape and are arranged in pairs on the plate with the recesses of a pair having their long axes aligned. The plate shown in Fig. 1 is for holding six slides and the pairs of recesses lie in a row with their long axes parallel.

A plurality of holding elements 13 are attached to the plate between the cells of respective pairs and the holding elements have free ends 13a, which overlie the recesses on opposite sides of the points of attachment of the elements to the plate. The holding elements are of flexible resilient material and may be made of strips of transparent resin secured to the face of plate 10 by adhesive. Preferably, the section 10a of the plate between the aligned recesses is countersunk, so that the holding means do not project beyond the face of the plate. The free ends 13a of strips 13 normally press upon slides 12 in the recesses, but may be lifted free of the slides, so that the latter may be slipped out of their recesses. To facilitate removal of the slides, the plate may be formed with a plurality of openings 14 leading through the rear face of the plate and into respective recesses and, preferably, each opening end leads into its recess near the end remote from section 10a of the plate. By inserting the finger through an opening and pushing on the slide overlying the opening, the outer end of the slide may be forced out of the recess, so that the slide can be grasped and easily withdrawn from the recess.

Instead of forming the holding elements 13 of the oblong strips shown in Fig. 1, the elements may have the form of strips 15 (Fig. 5), which taper in width toward their free ends. Another form of holding element is shown in Fig. 6 as including a central bar 16 secured between its ends to the recessed plate and having cross-pieces 17 at its free ends and resilient tongues 18 extending backward from the cross-pieces.

For convenience in identifying the stored holders, each holder may be provided with an undercut projection 19 extending along its edge. A support 20 for card 21 carrying identifying data may then be provided for mounting on the holder by means of the projection. The support 20 is preferably made of two halves 20a secured together face to face and formed to define a channel 22, in which projection 19 may be received. The two halves 20a of the support may also be formed to provide a channel, into which card 21 may be slipped.

It will be apparent that the new holder provides a convenient means for storing a plurality of microscope slides, and, at the same time, protecting them against damage. By forming the plate 10 and the holding elements 13 of transparent material, the identifying inscription on each slide is readily visible and may be read through either the front or the back of the holder and without removal of the slide therefrom. If desired, the holding means may be made with a rough surface, on which comments relative to the specimens on the slides may be written. The slides are wholly received within their recesses and are effectively held in position by the holding means, so that the slides are protected against injury even if the holder is dropped. Also, the slides of a single set of related specimens can be kept together and are readily available for examination or comparison with other slides. The holding means may be of a shape conforming substantially to that of the recess or cell, each slide being completely covered and protected as if in a closed room.

I claim:

1. A holder for microscopic slides for filing in side-by-side relationship with similar holders which comprises a plate-like member of rigid material having a plurality of shallow elongated recesses in one surface thereof, the recesses having bottom and side walls and being arranged in at least one row, and a plurality of substantially planar resilient elements secured to the walls defining the recesses and projecting into the recesses to overlie slides therein, said elements lying substantially wholly between the planes of the opposite faces of the plate-like member and extending substantially parallel to the bottoms of the recesses, the bottom of each recess having an opening therein leading into the recess adjacent a side wall thereof opposite that from which the resilient element extends to permit a member being inserted through the recess to partially lift a slide therein from the recess against the restraining force of the resilient element therein.

2. A holder for microscopic slides as defined in claim 1 in which the recesses are arranged in two rows with the recesses of said rows aligned in pairs.

3. A holder for microscopic slides as defined in claim 1 in which one edge of the plate-like member has an outwardly-extending projection and a support for identifying indicia is detachably secured to said projection.

JOHANNES VESTERDAL JORGENSEN.

REFERENCES CITED

The following references are of record in the file of this patent:

UNITED STATES PATENTS

| Number | Name | Date |
|---|---|---|
| 421,251 | Dean | Feb. 11, 1890 |
| 2,164,719 | Peterson et al. | July 4, 1939 |
| 2,366,886 | Van Tuyl | Jan. 9, 1945 |
| 2,594,653 | Jertson | Apr. 29, 1952 |

FOREIGN PATENTS

| Number | Country | Date |
|---|---|---|
| 324,314 | Italy | Jan. 28, 1935 |